(12) United States Patent
Nishida et al.

(10) Patent No.: US 9,864,890 B1
(45) Date of Patent: Jan. 9, 2018

(54) SYSTEMS AND METHODS FOR CONTEXTUALIZING DATA OBTAINED FROM BARCODE IMAGES

(71) Applicant: General Electric Company, Schenectady, NY (US)

(72) Inventors: Yoshifumi Nishida, San Jose, CA (US); Ching-Ling Huang, San Ramon, CA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 15/415,163

(22) Filed: Jan. 25, 2017

(51) Int. Cl.
*G06K 7/10* (2006.01)
*G06K 7/14* (2006.01)
*G06K 19/06* (2006.01)

(52) U.S. Cl.
CPC ....... *G06K 7/1447* (2013.01); *G06K 7/10722* (2013.01); *G06K 7/10881* (2013.01); *G06K 7/1417* (2013.01); *G06K 19/06037* (2013.01)

(58) Field of Classification Search
CPC ......... G06K 19/06037; G06K 7/10821; G06K 7/1417; G06K 7/1439; G06Q 30/00; G06Q 30/0267
USPC .................................. 235/375, 462.1, 462.11
See application file for complete search history.

(56) References Cited

U.S. PATENT DOCUMENTS

| | | | |
|---|---|---|---|
| 6,845,912 B2 | 1/2005 | Scannell | |
| 8,526,922 B1* | 9/2013 | Koster | H04M 3/5231 455/414.1 |
| 9,016,580 B2 | 4/2015 | Tsai et al. | |
| 2009/0300106 A1* | 12/2009 | Woodside | G06Q 30/00 709/203 |
| 2011/0062228 A1 | 3/2011 | Yoon et al. | |
| 2011/0215146 A1 | 9/2011 | Shams | |
| 2012/0314954 A1* | 12/2012 | Moore | G06K 9/00449 382/182 |
| 2014/0008440 A1 | 1/2014 | Patil | |
| 2015/0161427 A1 | 6/2015 | Guo et al. | |
| 2016/0117862 A1* | 4/2016 | Cardonha | G06F 17/30477 345/633 |

* cited by examiner

*Primary Examiner* — Seung Lee
(74) *Attorney, Agent, or Firm* — GE Global Patent Operation (57) ABSTRACT

A method for contextualizing barcode content data includes a mobile device obtaining images containing one or more barcodes, decoding at least one of the barcodes to determine its content, determining a metric magnitude quantifying a measurable relationship between at least one decoded barcode and the imaging device, comparing the metric magnitude to a predetermined condition, if the predetermined condition is satisfied, then accessing a respective barcode specific information data record based on respective barcode content, and providing at least one of contextual information and contextual instruction to the mobile computing device, via one or more forms of multi-modal communication (e.g., visual display, audio notification, tactile stimulus, etc.). Determining a distance between at least two barcodes in the image, and displaying a message based on the distance. A system configured to implement the method and a non-transitory computer-readable medium containing instructions for a processor to perform the method are also disclosed.

18 Claims, 8 Drawing Sheets

SYSTEMS AND METHODS FOR CONTEXTUALIZING DATA OBTAINED FROM BARCODE IMAGES

BACKGROUND

Barcodes are ubiquitous elements appearing on many items to identify, track, or provide information. Barcode can be single-dimensional (1D), for example a UPC package code, or two-dimensional (2D), for example, a QR code. Barcode reader applications are well-known and well-deployed. Conventional barcode reader applications read a single code at one time as their purpose is to utilize the barcode to obtain information about an object.

What is missing from the art is the ability to recognize one, two or more barcodes captured in the same image or a frame in a video stream in real-time manner, and provide contextual interaction to a user, or a device, based on information obtained after decoding the one, two or more barcodes.

DETAILED DESCRIPTION

Embodying systems and methods can capture one, two or more barcodes in the same image or a frame in video streams and decode the captured barcodes using a barcode reader application installed on a mobile computing device (e.g., smartphone, tablet, wearable computing device (watch, eyeglasses, head mounted devices), etc.). Embodying systems can provide contextual instruction and/or information based on the content of the barcodes captured in the same image. In accordance with embodiments, the proximity, distance, orientation, and/or angle between the captured barcodes can be analyzed by embodying systems and methods to develop the contextual instructions.

For example, embodying systems and methods can decode barcodes on multiple components captured in the same image, and provide assembly instruction(s) to a user (e.g., factory assembly, electronic system interconnection, etc.). In other implementations, a current location of a user can be obtained by interpolating, and/or triangulating, between positions indicated by decoding barcodes captured in the same image. In other implementations, supplemental information, instruction, and/or guidance can be provided by accessing datastore records associated with the barcodes. However, embodiments are not limited to these specific use examples, and other implementations are within the scope of this disclosure.

Figure 1:
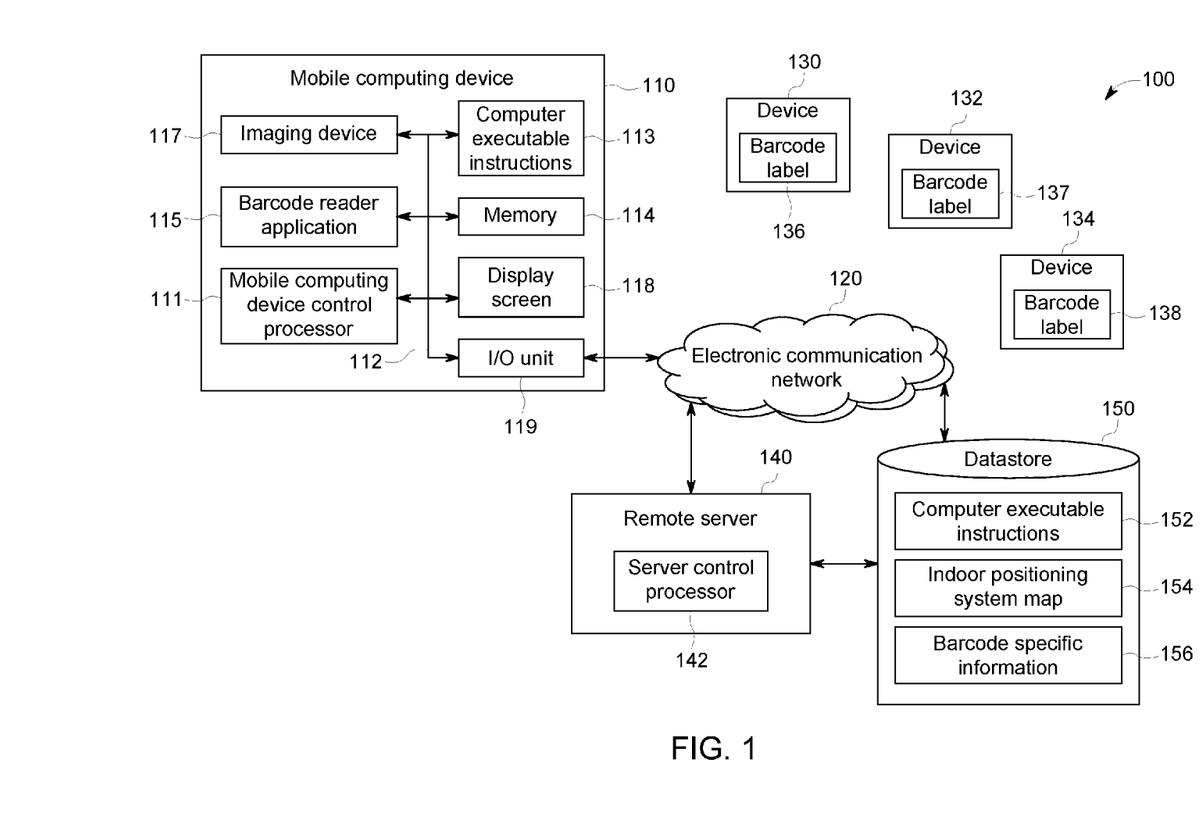
FIG. 1 depicts a system in accordance with embodiments.

FIG. 1 depicts system 100 for decoding barcodes and providing contextual instruction and/or information in accordance with embodiments. The contextual instruction and/or information can be provided in via multi-modal communication (e.g., visual display, audio notification, tactile stimulus, etc.) to a mobile computing device. An embodying system includes mobile computing device 110, which can include control processor 111 that communicates with other components over internal data/control bus 112. Control processor 111 accesses computer executable instructions 113, which can be stored in memory 114 to implement barcode reader application 115. The mobile computing device can include input/output (I/O) unit 119 that communicates across electronic communication network 120. I/O unit 119 can support one or more hardwire and/or wireless communication protocols including, but not limited to, cellular telephone protocol, Bluetooth, low energy Bluetooth, iBeacon, near field communication, Airplay, etc.

Mobile computing device 110 can include imaging device 117 (e.g., a camera or other image capture device). An image captured by imaging device 117 can be displayed on display screen 118. The captured image can be a still photograph or a video (including video of a moving object). Imaging device 117 can have a field-or-view wide enough so that two or more barcodes 136, 137, 138 located on respective devices 130, 132, 134 can be captured in the same image. The mobility afforded to users by mobile computing device 110 allows the user to move about and perform tasks between barcode scanning.

Barcodes are ubiquitous and can appear on just about any type of item. Accordingly, embodying systems and methods are not limited by the nature and/or type of devices 130, 132, 134. In implementations, barcodes 136, 137, 138 can each be an applique appearing on a surface of a structure (e.g., ceiling, wall, pillar, etc.). Barcode reader application 115 can interpret captured images (still photograph or video) to extract the barcode from the image and obtain data represented by the barcode.

Electronic communication network 120 can be, can comprise, or can be part of, a private internet protocol (IP) network, the Internet, an integrated services digital network (ISDN), integrated services digital network (ISDN), a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication infrastructure. It should be recognized that techniques and systems disclosed herein are not limited by the nature of electronic communication network 120.

Coupled to electronic communication network 120 can be remote server 140, which can include server control processor 142. Operation, communication and other functions of the remote server can be performed under the control of server control processor 142. Communicatively coupled to the remote server is datastore 150 where computer executable instructions 152 can be stored. The server control processor can access computer executable instructions 152 to perform its operations. Datastore 150 can include a repository of data records including indoor positioning system (IPS) map 154 and barcode specific information 156. The barcode specific information can be used to provide supplemental information, instruction, and/or guidance based on the decoded content of a barcode. Communication with datastore 150 can be across electronic communication network 120.

In implementations, IPS map 154 can be accessed by mobile computing device 110 and displayed on mobile computing device screen 118. IPS map 154 can include a coordinate system to locate positions within the structure represented by the map. In implementations, IPS map 154 can include a layout of a floorplan for the structure. For example, an IPS map of a retail establishment can include shelving units, aisles, counters, open spaces, etc. A map can be provided for each floor of a multi-floor structure.

In accordance with embodiments, mobile computing device 110 can capture an image containing one or more barcodes. The image can be provided to a remote computing device (e.g., remote server 140). The remote server can decode the barcode image, and perform other tasks described herein. This implementation can be implemented when mobile computing device 110 lacks sufficient processing power.

Figure 2:
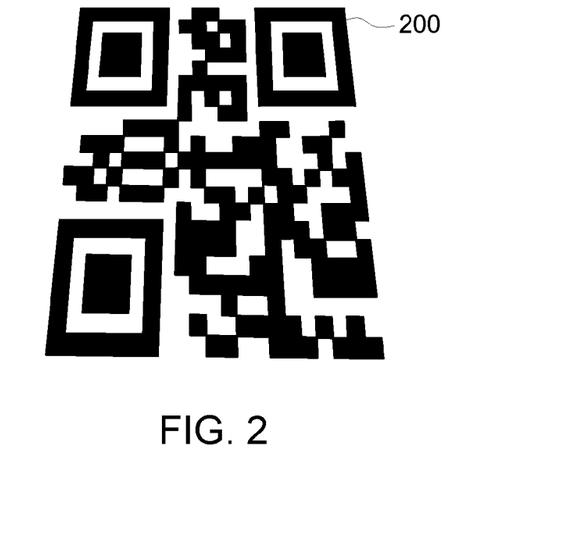
FIG. 2 depicts a barcode image captured by the system of FIG. 1 in accordance with embodiments.

FIG. 2 depicts barcode image 200 captured by imaging device 112 in accordance with embodiments. Barcode image 200 is exemplary of a barcode image captured when the barcode is not normal to a longitudinal axis of the imaging device—i.e., the barcode is slanted off the longitudinal axis. This slant can result in distortion of the barcode image—e.g., the foreground is wider and there are nonlinearities within the image itself. In accordance with embodiments, barcode reader application 115 is capable of identifying the location of barcode labels 136, 137, 138 on respective devices 130, 132, 134.

Figure 3:
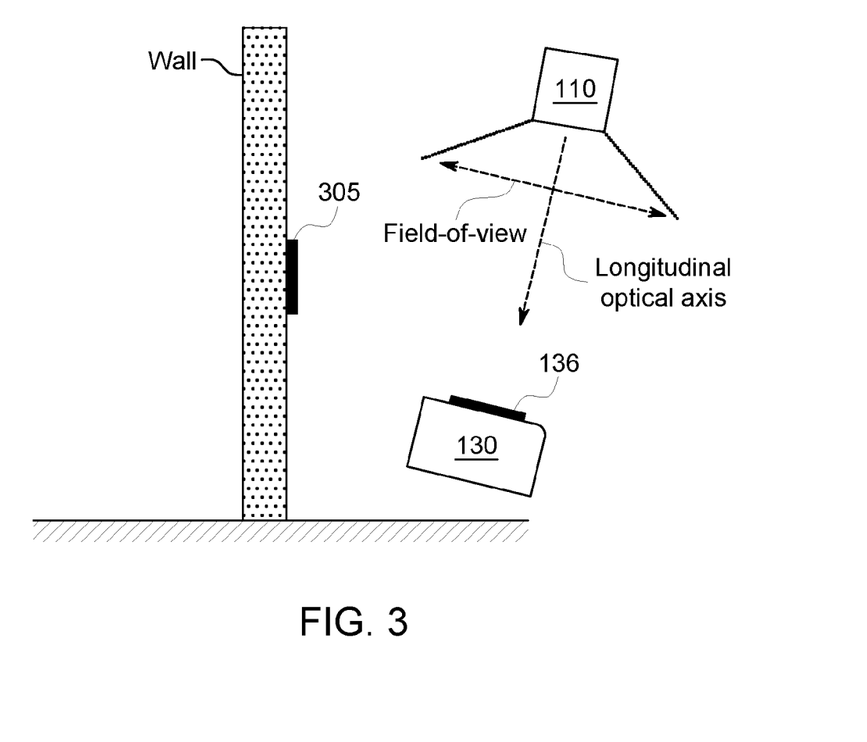
FIG. 3 depicts the capture of two barcodes by the system of FIG. 1 in accordance with embodiments.

FIG. 3 depicts the capture of two barcodes 136, 305 by imaging device 112 within mobile computing device 110 in accordance with embodiments. FIG. 3 depicts barcode 305 positioned on a vertical wall (or other surface) and barcode 136 is depicted on the surface of device 130.

Barcode 136 is positioned about perpendicular to a longitudinal optical axis of the imaging device. Barcode 305 is positioned at an angle off the longitudinal axis, but still within the field-of-view of imaging device 112. In accordance with embodiments, both barcode 136 and barcode 305 can be captured by imaging device 112. Embodying systems and methods are not limited to the capture of only two barcodes; the capture of one, two or more barcodes is within the contemplation of this disclosure. The barcodes of the captured image can be decoded by barcode reader application 115. In implementations, the perspective view of barcode 305 resulting from its off-axis positioning can improve its readability by the barcode reader application because the barcode will appear as expected (i.e., square) to the barcode reader application.

In accordance with embodiments, selection and decoding of a barcode (or multiple barcodes) in an image can be based on a magnitude of a metric that quantifies a relationship. As a first non-limiting example, a metric can be the distance between the barcode and the imaging device, and the condition can be if the distance is less than a predetermined threshold. If the magnitude of the metric satisfies a predetermined condition, then a contextual user interaction can be triggered.

In accordance with an implementation, an attempt to decode the barcode can be made, and then the metric evaluated. If the metric satisfies a predetermined condition, a contextual user interaction can be triggered. In accordance with another implementation, when a barcode is captured, the metric can be evaluated. If the metric satisfies a predetermined condition, the barcode can be decoded and then trigger a contextual user interaction.

In another non-limiting example, the metric can be an angle between barcodes in the same image and/or camera frame view, and the condition can be if the distance of one barcode to the imaging device is within a predetermined threshold. As another example, the metric can be the quantity of barcodes within the image, and the condition can be trigger a first action or a second action based on if the quantity is above/below a predetermined threshold.

Figure 4A:
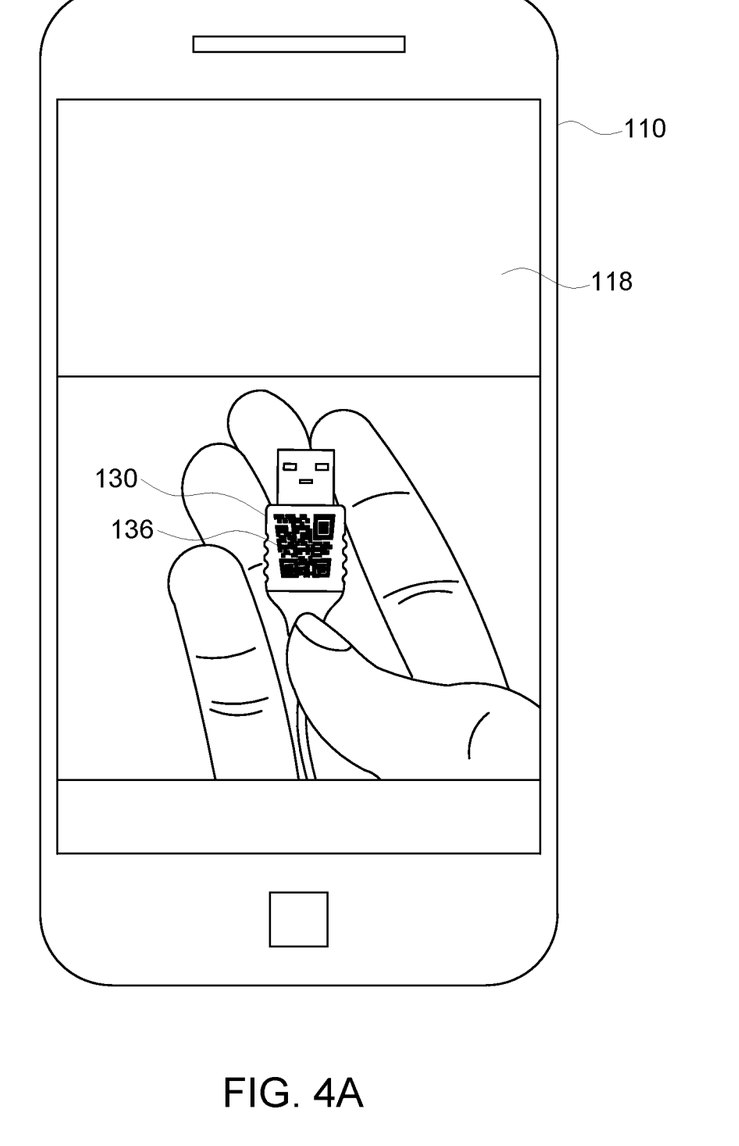
FIGS. 4A-4D depict a mobile computing device display screen during an exemplary sequence of actions in accordance with embodiments.

FIGS. 4A-4D depict display screen 118 of mobile computing device 110 during an exemplary sequence of actions in accordance with embodiments. FIG. 4A depicts a first portion of the sequence where a user presents to imaging device 117 a cable plug (e.g., device 130) having barcode label 136. In accordance with embodiments, this is a single barcode interaction.

In a single barcode interaction, the single barcode is decoded. Information about the actual size of the barcode can be stored in barcode specific information 156. In implementations, the barcode specific information can be stored in mobile computing device memory 114. In implementations, the barcode specific information can be obtained by decoding the barcode itself.

The specific information can include the actual size of the barcode. In implementations, the size of the barcode can be calculated from the obtained image based on the imaging device optical resolution and other optical properties of the imaging device and/or obtained image. For example, the barcode size can be determined by using the known size of the barcode as a reference scale in the obtained image. The distance estimation between the imaging device and the barcode needs to be calibrated by several factors (e.g., imaging device pixel resolution, focal length, and angle-of-view; also the appearance of a square unit area in terms of pixels).

In accordance with embodiments, an estimate of the distance between the imaging device and the barcode can be determined from the barcode actual size (which can be coded into the barcode itself) and its appearance in the image. If this estimated distance is greater than or equal to a predetermined threshold, no action is taken with regard to that particular barcode. However, if the estimated distance is less than the predetermined threshold, further action is taken with regard to the barcode. In accordance with embodiments, this action can include accessing barcode specific information, and displaying a message on the mobile computing device display screen.

Figure 4B:
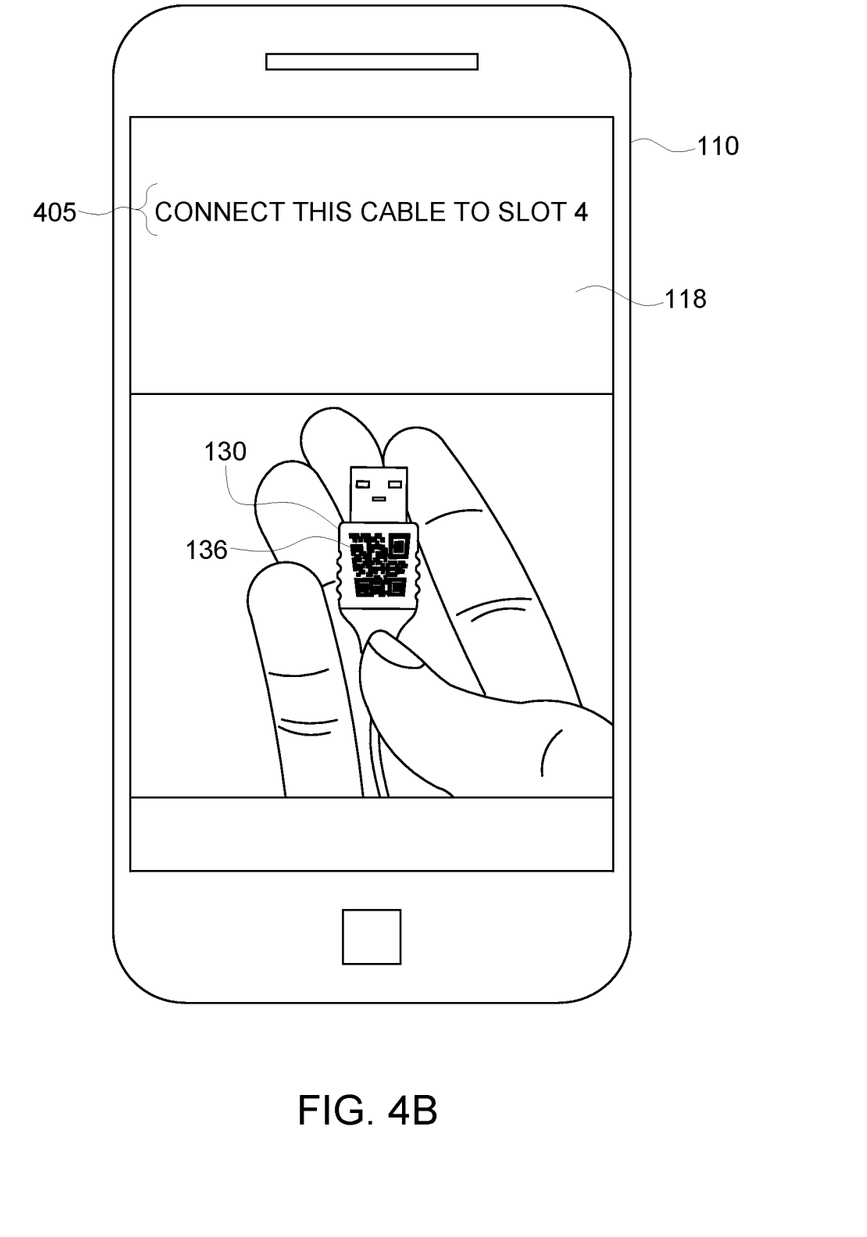

FIG. 4B depicts the image of FIG. 4A now with message 405 displayed on the display screen. Because the distance (i.e., the metric) separating the mobile computing device and device 130 is less than (i.e., the condition) the predetermined threshold, the display screen includes message 405, which states "CONNECT THIS CABLE TO SLOT 4." In another example, a user of a wearable eyeglass computing device can pick up a specific tool or part and bring it to a distance less than the predetermined threshold. This proximity to the wearable computing device can trigger access to barcode specific information that can then be presented to the user—for example, information on the item itself, information on a task to be performed with the item, confirmation of whether the item is for the task, etc.

Figure 4C:
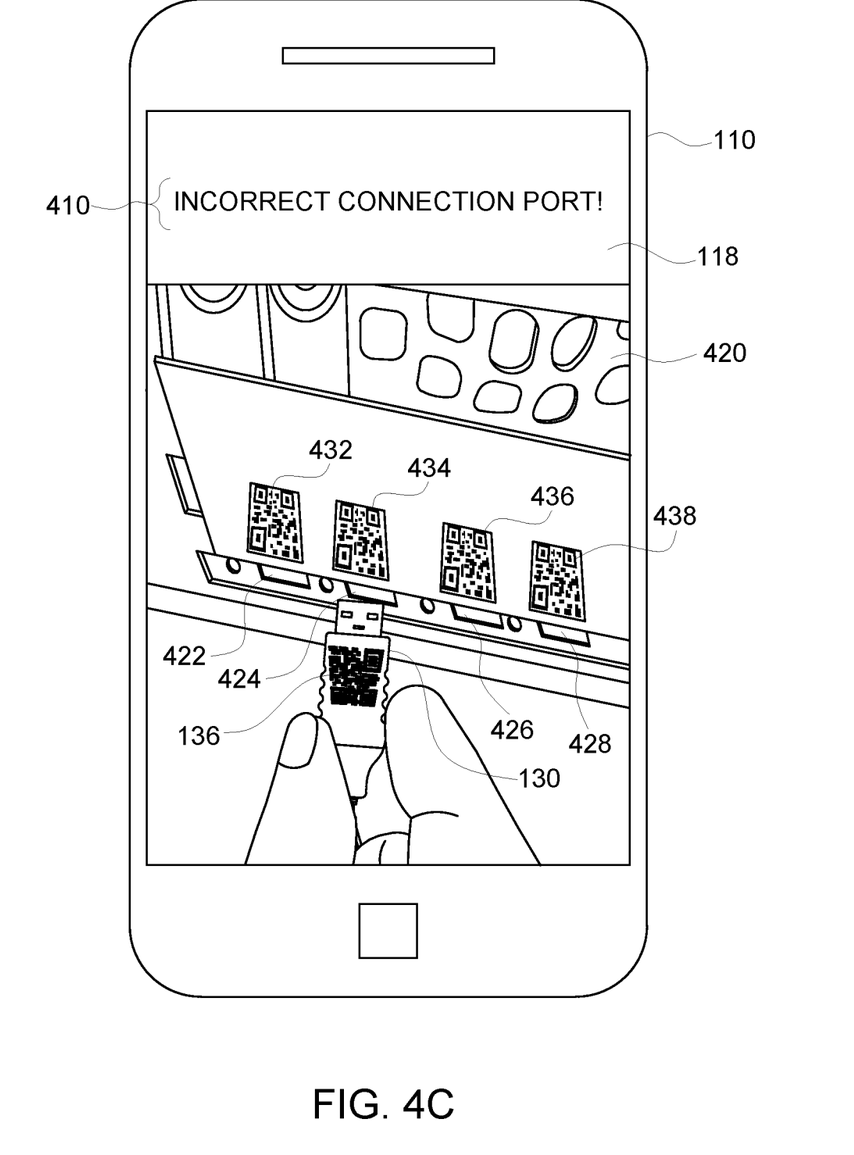

FIG. 4C depicts device 130 in proximity to equipment chassis 420. Equipment chassis 420 can include multiple connection points 422, 424, 426, 428. Also on the equipment chassis, and near respective connection points, are corresponding barcodes 432, 434, 436, 438.

In the implementation illustrated in FIG. 4C there is interaction between multiple barcodes. Barcode specific information is accessed for each barcode in the image that is a distance less than the predetermined threshold. As with the single barcode interaction, the actual sizes of the barcodes can be predefined or can be obtained from the barcodes themselves. The barcode specific information can be accessed from datastore 150, from mobile computing device memory 114, or decoded from the barcode itself.

The relative positions and angles between the multiple barcodes can be estimated from their position and angles in the image. In accordance with embodiments, specific interactions can be launched based on predefined rules. For example, when there are two barcodes along the same line with the same angle, at a certain distance, an interaction can be launched. As depicted in FIG. 4C, barcode 136 on device 130 and barcode 434 associated with connection point 424 meet a predefined rule. Message 410 is displayed indicating that the cable is near to an incorrect connection point. This interaction, and resulting message, can be monitored by calculating, and periodically recalculating, the distance and the angle between the cable and the connection point.

Figure 4D:
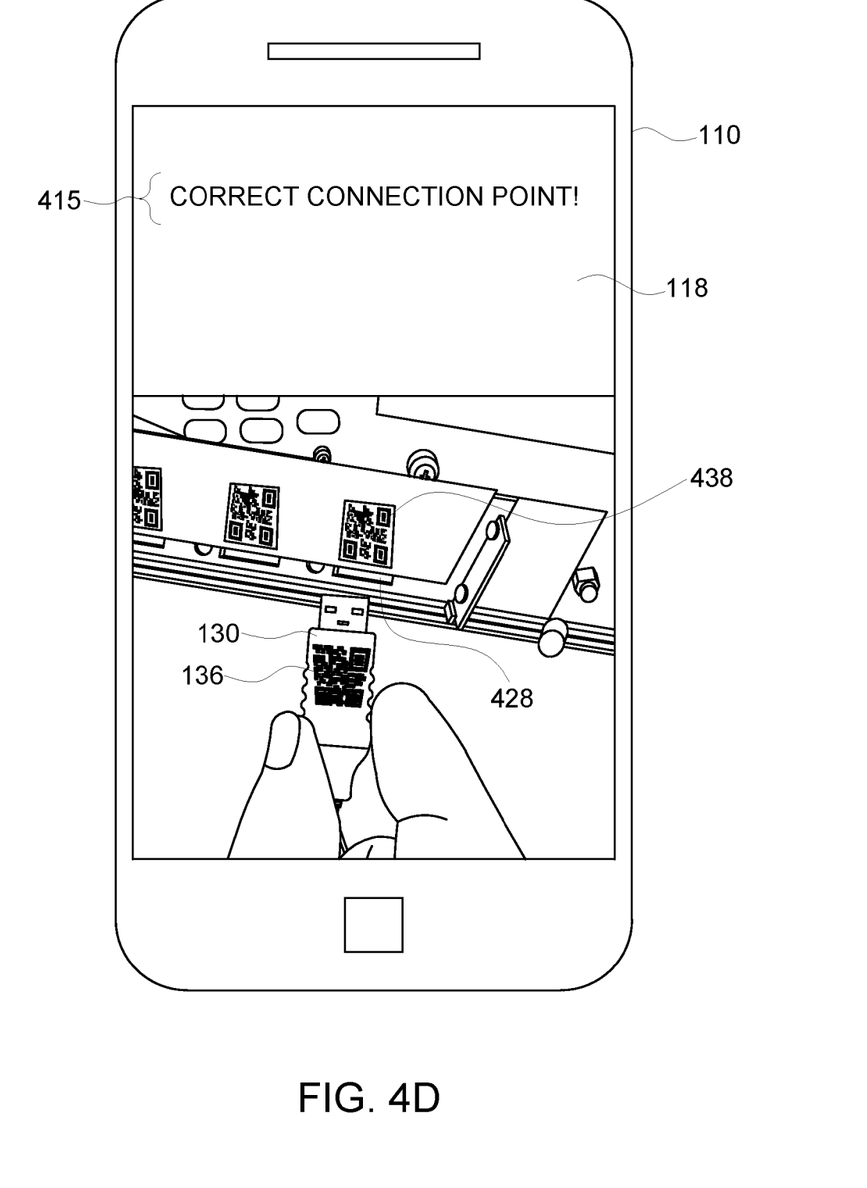

FIG. 4D illustrates device 130 in proximity to connection point 428. Barcode 136 and barcode 438 can each be decoded, and their associated barcode specific information obtained. Analysis of the barcode specific information results in a determination that device 130 is in proximity with the correct connection point. Message 415 is displayed indicating that device 130 is positioned at the correct connection point.

Figure 5:
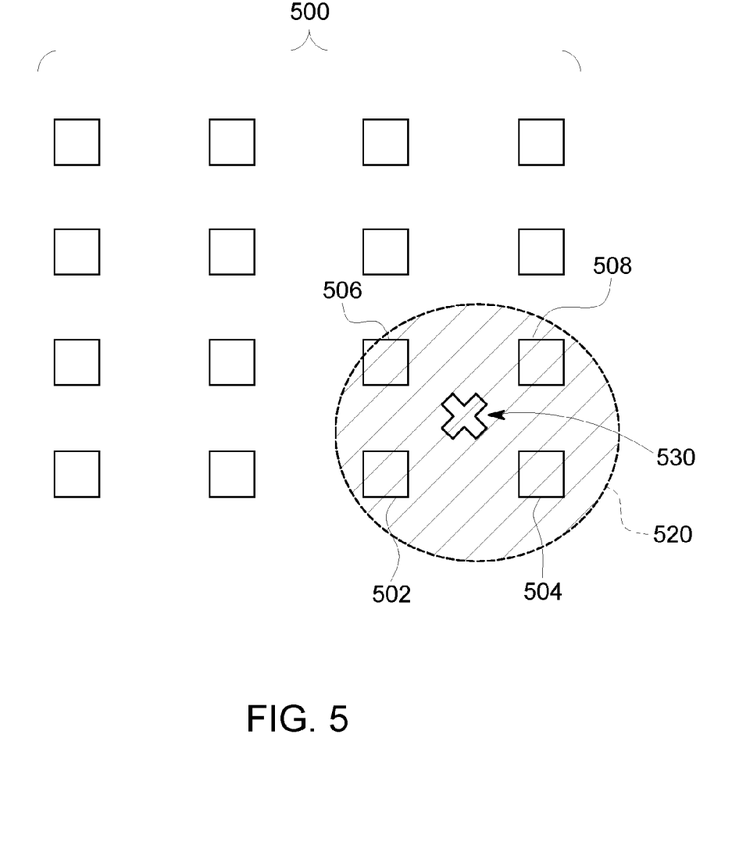
FIG. 5 depicts the capture of multiple barcodes in accordance with embodiments.

FIG. 5 depicts the capture of multiple barcodes to determine positioning information in accordance with embodiments. Multiple barcodes 500 can be located on an interior surface of a structure. For example, FIG. 5 illustrates multiple barcodes 500 distributed on a ceiling. Barcodes 500 can be an applique adhered to the ceiling, on a luminaire, other fixture, etc. However, the multiple barcodes can be on any surface of the structure (e.g., ceiling, wall, pillar, etc.). Additionally, not all the barcodes need to be on the same surface—for example, one or more of barcodes 500 can be on a ceiling and others can be on a wall.

In the illustrated example, the multiple barcodes 500 can be at a certain density spacing. The position of the barcode placement can be logged in IPS map 154, resident in mobile computing device memory 114, or decoded from the barcode itself.

Imaging device 117 can capture barcodes 502, 504, 506, 508 within its field-of-view 520. The mobile computing device can be handheld and positioned by the user; in implementations the mobile computing device can be a wearable headgear device.

In accordance with embodiments, the position of each barcode 502, 504, 506, 508 within field-of-view 520 can be obtained. Embodying systems and methods can analyze the captured images periodically and obtain the barcode positions as the mobile computing device moves about the structure. The relative position of the barcodes within the captured image can be compared with their actual positions based on the IPS map. This comparison can result in a determination of mobile computing device location 530. With more than two barcodes in the field-of-view, triangulation can be performed to determine location 530.

In some implementations, position can be estimated with two barcodes in the field-of-view. The accuracy of such distance estimation varies dependent on the distribution of the two barcodes within the field-of-view, with higher accuracy obtained when the barcodes are disposed across from the center point of the field-of-view. If not, then the size of each barcode, and the distance between them is needed to be known.

Figure 6:
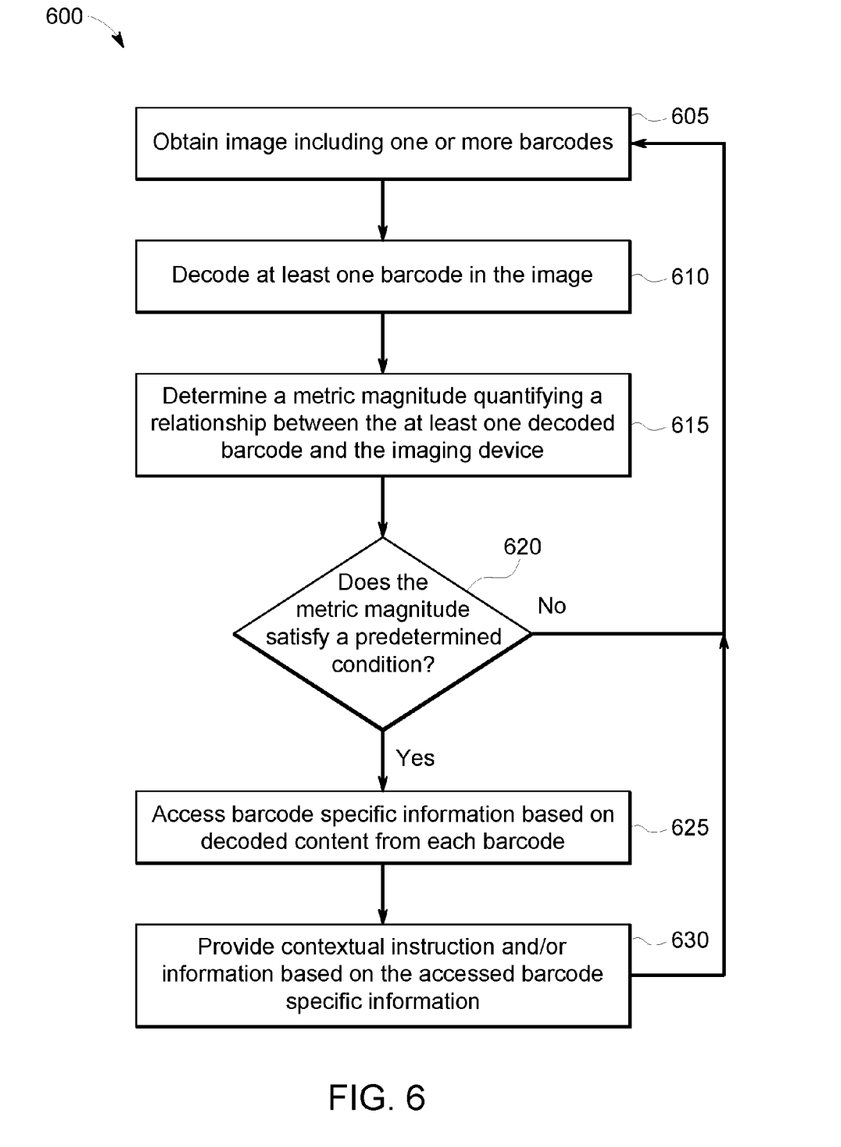
FIG. 6 depicts a flowchart of a process for capturing barcodes and providing contextual information in accordance with embodiments.

FIG. 6 depicts process 600 for capturing barcodes and providing contextual information in accordance with embodiments. Imaging device 117 obtains an image, step 605, of one or more barcodes placed on respective devices. At least one barcode in the image is decoded, step 610. The magnitude of a metric quantifying a measureable relationship between the decoded barcode(s) and the imaging device is determined, step 615. In one implementation, the metric can be distance, where the distance between the imaging device and the barcode can be determined from the barcode actual size and its appearance in the image. The barcode actual size can be coded into the barcode itself, or by accessing barcode specific information records in memory 114, or datastore 150. In implementations, the size of the barcode can be calculated from the obtained image based on the imaging device optical resolution and other optical related details.

The metric magnitude is compared to a predetermined condition, step 620. The predetermined condition can be varied depending on the particular implementation. For example, when viewing device interconnections (FIGS. 4A-4D), a predetermined distance threshold could be less than the predetermined distance threshold applied when implementing position determination in a structure (FIG. 5). If the predetermined condition is not satisfied, process 600 returns to step 605. If the predetermined condition is satisfied, barcode specific information can be accessed for each decoded barcode in the image, step 625.

Contextual instruction and/or information based on the content of the barcode specific information is provided, step 630. In accordance with embodiments, in addition to barcode specific information the proximity, distance, orientation, and/or angle between the barcodes can be analyzed by embodying systems and methods to develop the contextual instructions. Process 600 continues to obtain images (step 605).

In accordance with embodiments, a computer program application stored in non-volatile memory or computer-readable medium (e.g., register memory, processor cache, RAM, ROM, hard drive, flash memory, CD ROM, magnetic media, etc.) may include program code and/or computer executable instructions that when executed may instruct and/or cause a controller or processor to perform methods discussed herein such as a method for decoding one, two or more barcodes captured in the same image and providing contextual instruction and/or information, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for contextualizing data obtained from barcode images, the method comprising:

an imaging device obtaining images containing one or more barcodes, the imaging device in communication with a mobile computing device;

decoding at least one of the one or more barcode to determine content of the barcode;

determining a metric magnitude quantifying a measureable relationship between at least one decoded barcode and the imaging device;

comparing the metric magnitude to a predetermined condition;

if the predetermined condition is satisfied, then accessing a respective barcode specific information data record based on respective barcode content; and providing at least one of contextual information and contextual instruction to the mobile computing device.

2. The method of claim 1, the determining metric magnitude step including accessing a respective barcode specific information data record to obtain an actual size of the respective barcode.

3. The method of claim 1, the determining metric magnitude step including obtaining an actual size of the respective barcode from the decoded content.

4. The method of claim 1, the determining metric magnitude step including optical properties of the imaging device in the determination.

5. The method of claim 1, respective barcodes of the one or more barcodes affixed to a respective device, and the at least one of the contextual information and the contextual instruction related to an activity incorporating at least one of the respective devices.

6. The method of claim 5, including analyzing at least one of a proximity, a distance, an orientation, and an angle between two or more of the at least one barcodes to develop the contextual instructions and contextual information.

7. The method of claim 1, including analyzing at least one of a proximity, a distance, an orientation, and an angle between two or more of the at least one barcodes to develop the contextual instructions and contextual information.

8. The method of claim 1, respective barcodes of the one or more barcodes affixed to a respective device, the method including:

determining a distance between at least two of the respective devices; and providing to the mobile computing device a first contextual message selected based on the determined distance.

9. The method of claim 8, including:

repeating determining the distance between the respective devices; and providing to the mobile computing device a second contextual message based on the result of the repeated distance, wherein the first contextual message and the second contextual message are one of the same and different content.

10. A non-transitory computer readable medium containing computer-readable instructions stored therein for causing a control processor to perform a method for contextualizing data obtained from barcode images, the method comprising:

an imaging device obtaining images containing one or more barcodes, the imaging device in communication with a mobile computing device;

decoding at least one of the one or more barcode to determine content of the barcode;

determining a metric magnitude quantifying a measureable relationship between at least one decoded barcode and the imaging device;

comparing the metric magnitude to a predetermined condition;

if the predetermined condition is satisfied, then accessing a respective barcode specific information data record based on respective barcode content; and providing at least one of contextual information and contextual instruction to the mobile computing device.

11. The non-transitory computer readable medium of claim 10 containing computer-readable instructions stored therein to cause the control processor to perform the determining metric magnitude step by including accessing a respective barcode specific information data record to obtain an actual size of the respective barcode.

12. The non-transitory computer readable medium of claim 10 containing computer-readable instructions stored therein to cause the control processor to perform the determining metric magnitude step by including obtaining an actual size of the respective barcode from the decoded content.

13. The non-transitory computer readable medium of claim 10 containing computer-readable instructions stored therein to cause the control processor to perform the method, including analyzing at least one of a proximity, a distance, an orientation, and an angle between two or more of the at least one barcodes to develop the contextual instructions and contextual information.

14. The non-transitory computer readable medium of claim 10 containing computer-readable instructions stored therein to cause the control processor to perform the method, including:

determining a distance between at least two respective devices of the obtained image, each of the two respective devices having a respective barcode affixed thereto; and providing to the mobile computing device a first contextual message selected based on the determined distance.

15. The non-transitory computer readable medium of claim 14 containing computer-readable instructions stored therein to cause the control processor to perform the method, including:

repeating determining the distance between the respective devices; and providing to the mobile computing device a second contextual message based on the result of the repeated distance, wherein the first contextual message and the second contextual message are one of the same and different content.

16. A system for contextualizing data obtained from barcode images, the system comprising:

a mobile computing device including a control processor, a barcode reader application and an imaging device in communication across an internal data/control bus;

the control processor configured to access non-transitory computer executable instructions that cause the control processor to perform a method, the method including:

the imaging device obtaining images containing one or more barcodes;

decoding at least one of the one or more barcode to determine content of the barcode;

determining a metric magnitude quantifying a relationship between at least one decoded barcode and the imaging device;

comparing the metric magnitude to a predetermined condition;

if the predetermined condition is satisfied, then accessing a respective barcode specific information data record based on respective barcode content; and providing at least one of contextual information and contextual instruction to the mobile computing device.

17. The system of claim 16, the non-transitory computer executable instructions including instructions that cause the control processor to perform the determining metric magnitude step by including one of: accessing a respective barcode specific information data record to obtain an actual size of the respective barcode, and obtaining an actual size of the respective barcode from the decoded content.

18. The system of claim 16, the non-transitory computer executable instructions including instructions that cause the control processor to:

determining a distance between at least two respective devices of the obtained image, each of the two respective devices having a respective barcode affixed thereto;

providing to the mobile computing device a first contextual message selected based on the determined distance;

repeating determining the distance between the respective devices; and providing to the mobile computing device a second contextual message based on the result of the repeated distance, wherein the first contextual message and the second contextual message are one of the same and different content.

* * * * *